United States Patent
Jordan et al.

(10) Patent No.: US 10,657,252 B2
(45) Date of Patent: May 19, 2020

(54) DETECTING MALICIOUS CODE EMBEDDED IN DOCUMENTS

(71) Applicant: Oracle International Corporation, Redwood Shores, CA (US)

(72) Inventors: Alexander W. Jordan, Brisbane (AU); Francois Gauthier, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 220 days.

(21) Appl. No.: 15/824,881

(22) Filed: Nov. 28, 2017

(65) Prior Publication Data

US 2018/0373869 A1   Dec. 27, 2018

Related U.S. Application Data

(60) Provisional application No. 62/523,634, filed on Jun. 22, 2017.

(51) Int. Cl.
 G06F 21/56   (2013.01)
 G06F 40/12   (2020.01)

(52) U.S. Cl.
 CPC .......... *G06F 21/563* (2013.01); *G06F 21/561* (2013.01); *G06F 21/566* (2013.01); *G06F 40/12* (2020.01)

(58) Field of Classification Search
 CPC .............................. G06F 21/566; G06F 21/565
 USPC ........................................................... 726/24
 See application file for complete search history.

(56) References Cited

U.S. PATENT DOCUMENTS

| | | | |
|---|---|---|---|
| 2013/0160127 A1* | 6/2013 | Jeong | G06F 21/566 726/24 |
| 2014/0143880 A1* | 5/2014 | Artzi | G06F 21/00 726/25 |
| 2015/0363598 A1* | 12/2015 | Xu | G06F 21/563 726/23 |

OTHER PUBLICATIONS

Guillaume Endignoux et al., "Caradoc: A Pragmatic Approach to PDF Parsing and Validation", IEEE Security and Privacy Workshops, May 22, 2016 (14 pages).

Saruhan Karademir et al., "Using Clone Detection to Find Malware in Acrobat Files", CASCON '13 Proceedings of the 2013 Conference of the Center for Advanced Studies on Collaborative Research, Nov. 18, 2013 (11 pages).

Pavel Laskov et al., "Static Detection of Malicious JavaScript-Bearing PDF Documents", Proceedings of the 27th Annual Computer Security Applications Conference, Dec. 5, 2011 (10 pages).

Xun Lu et al., "De-obfuscation and Detection of Malicious PDF Files with High Accuracy", 2013 46th Hawaii International Conference on System Sciences, Jan. 7, 2013 (10 pages).

(Continued)

*Primary Examiner* — Teshome Hailu
(74) *Attorney, Agent, or Firm* — Ferguson Braswell Fraser Kubasta PC

(57) ABSTRACT

A method for analyzing a document may include obtaining a runtime model for an application used to process the document, extracting, from the document, code blocks each including statements, and generating, using the runtime model, a result including a series of abstract states for each statement of a code block. Each abstract state may include a series of abstract values each corresponding to concrete values. The method may further include determining, using the result and the runtime model, whether the document includes potentially malicious code.

12 Claims, 8 Drawing Sheets

(56) References Cited

OTHER PUBLICATIONS

Davide Maiorca et al., "A pattern recognition system for malicious PDF files detection", MLDM'12 Proceedings of the 8th international conference on Machine Learning and Data Mining in Pattern Recognition, Jul. 13, 2012 (15 pages).

Nir Nissim et al., "Detection of malicious PDF files and directions for enhancements: A state-of-the art survey", Computers and Security, Oct. 23, 2014 (22 pages).

Nir Nissim et al,, "Keeping pace with the creation of new malicious PDF files using an active-learning based detection framework", Security Informatics, Dec. 1, 2016 (20 pages).

Nir Nissim et al,, "ALPD: Active learning framework for enhancing the detection of malicious PDF files", JISIC '14 Proceedings of the 2014 IEEE Joint Intelligence and Security Informatics Conference, Sep. 24, 2014 (8 pages).

Christiaan Leonard Schade, "FCScan: A new lightweight and effective approach for detecting malicious content in electronic documents", University of Twente., Jun. 11, 2013 (67 pages).

Charles Smutz et al., "Malicious PDF detection using metadata and structural features", Proceedings of the 28th Annual Computer Security Applications Conference, Dec. 3, 2012 (10 pages).

Kevin Z. Snow et al., "SHELLOS: enabling fast detection and forensic analysis of code injection attacks", In Proceedings of the 20th USENIX conference on Security, Aug. 8, 2011 (16 pages).

Zacharias Tzermias et al., "Combining static and dynamic analysis for the detection of malicious documents", EUROSEC '11 Proceedings of the Fourth European Workshop on System Security, Apr. 10, 2011 (6 pages).

Cristina Vatamanu et al., "A practical approach on clustering malicious PDF documents", Journal in Computer Virology, vol. 8 Issue 4, Nov. 1, 2012 (13 pages).

\* cited by examiner

PDF-
JavaScript
Runtime
Model
450

452 var app = {

454 alert: function(cMsg) (return $T_{number}$; ),

/* ... */ }

456 var doc = {

458 author: $T_{string}$, 460 subject: $T_{string}$,

/* ... */ }

462 function PDF_Event() { this.type = $T_{string}$ this.name = $T_{string}$ this.commitKey = $T_{number}$ this.fieldFull = $T_{Bool}$ this.source = PDF_DOM_NODE this.target = PDF_DOM_NODE this.targetName = PDF_DOM_NODE.name this.value = $T_{string}$ }

464 var PDF_DOM_NODE = { name: $T_{string}$ value: $T_{string}$ }

DETECTING MALICIOUS CODE EMBEDDED IN DOCUMENTS

CROSS-REFERENCE TO RELATED APPLICATION

This application claims benefit under 35 U.S.C. § 119(e) to U.S. Provisional Patent Application Ser. No. 62/523,634, filed on Jun. 22, 2017, and entitled "DETECTING MALICIOUS CODE EMBEDDED IN DOCUMENTS." U.S. Provisional Patent Application Ser. No. 62/523,634 is incorporated herein by reference in its entirety.

BACKGROUND

The most basic defense against malware in documents is the avoidance (e.g., removal) of executable code. For example, documents represented in the Portable Document Format (PDF) may include embedded interactive elements written in the JavaScript programming language, where malware may be avoided by removing or blocking the JavaScript code. Another defense is to disable the executable code in the software application (e.g., PDF reader software) that reads the document. However, these approaches degrade usability by preventing the execution of harmless, useful features. For example, interactive forms may no longer be able to function.

A common method for identifying malware, used by anti-virus software, is to search files for signatures or patterns of known malicious files. However, document-related malware often obfuscates its malicious code to avoid detection methods based on matching the text of the executable code against a signature or pattern. Therefore, methods based on matching signatures or patterns may be effective only for known malware, and may be vulnerable to new attacks. Other methods for detecting malware analyze behavior of the executable code while executing in a sandbox environment. However, there is no guarantee that malicious behavior will be observed within the sandbox (e.g., the malicious behavior might be triggered by a combination of factors not present in the sandbox).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for analyzing a document including obtaining a runtime model for an application used to process the document, extracting, from the document, code blocks each including statements, and generating, using the runtime model, a result including a series of abstract states for each statement of a code block. Each abstract state includes a series of abstract values each corresponding to concrete values. The method further includes determining, using the result and the runtime model, whether the document includes potentially malicious code.

In general, in one aspect, one or more embodiments relate to a system including a processor, and a repository configured to store a runtime model and a document. The document includes code blocks each including statements. The system further includes a processor and a memory including instructions that, when executed by the processor, cause the processor to obtain a runtime model for an application used to process the document, extract, the code blocks from the document, and generate, using the runtime model, a result including a series of abstract states for each statement of a code block. Each abstract state includes a series of abstract values each corresponding to concrete values. The instructions further cause the processor to determine, using the result and the runtime model, whether the document includes potentially malicious code.

In general, in one aspect, one or more embodiments of the invention relate to a non-transitory computer readable medium including instructions that, when executed by a processor, perform obtaining a runtime model for an application used to process the document, extracting, from the document, code blocks each including statements, and generating, using the runtime model, a result including a series of abstract states for each statement of a code block. Each abstract state includes a series of abstract values each corresponding to concrete values. The instructions further cause the processor to perform determining, using the result and the runtime model, whether the document includes potentially malicious code.

Other aspects of the invention will be apparent from the following description and the appended claims.

BRIEF DESCRIPTION OF DRAWINGS

FIG. 4A, FIG. 4B, and FIG. 4C show examples in accordance with one or more embodiments of the invention.

DETAILED DESCRIPTION

Figure 1A:
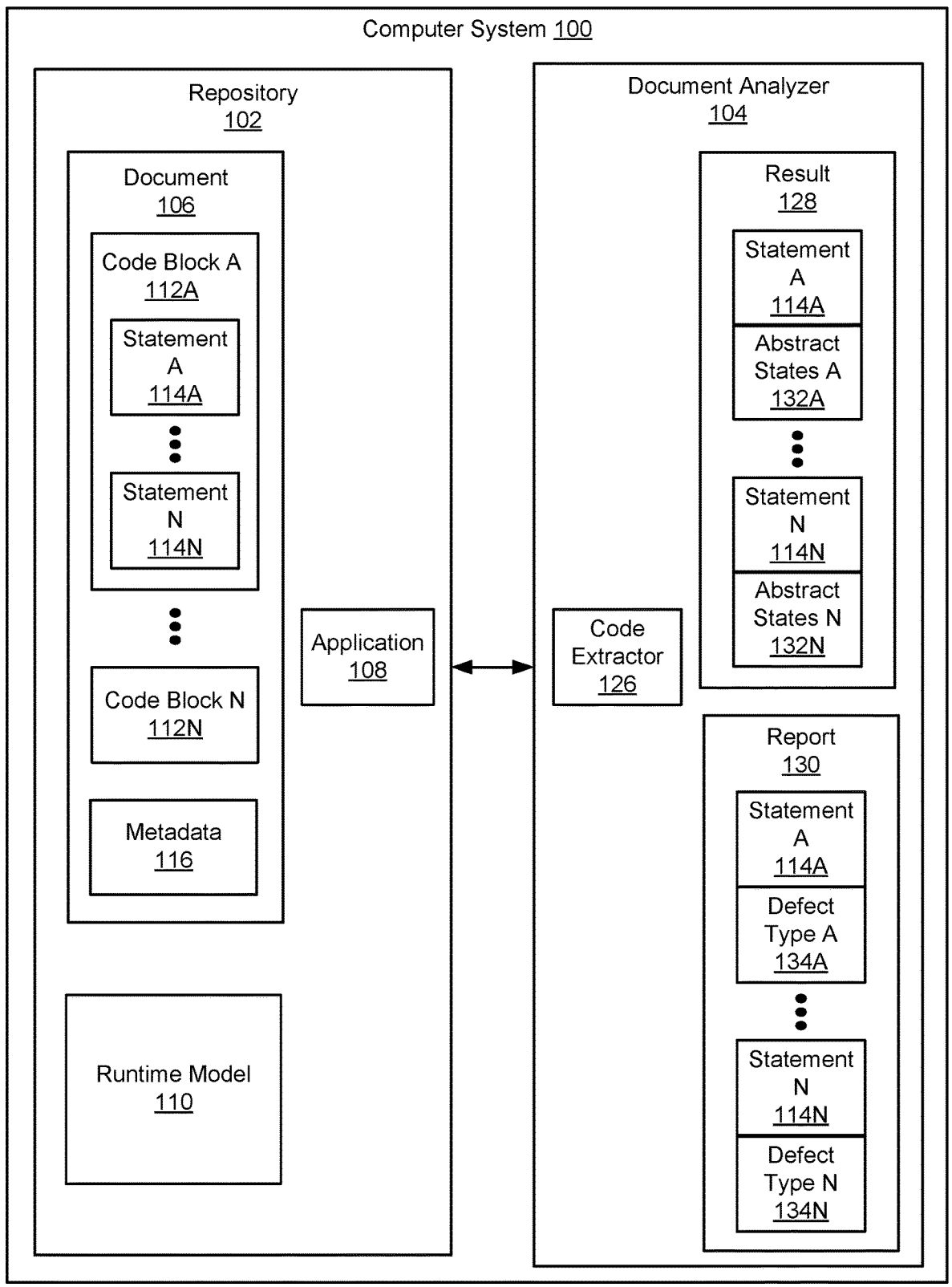
FIG. 1A and FIG. 1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to analyzing a document to identify potentially malicious embedded code. In one or more embodiments, the analysis proceeds relative to a runtime model for an application (e.g., a Portable Document Format (PDF) reader) used to process the document. In one or more embodiments, the runtime model supports the abstract interpretation of code blocks embedded in the document, where abstract interpretation proceeds via the generation of abstract values, and the propagation of abstract values between code blocks. An abstract value may correspond to a set of concrete values. For example, when performing abstract interpretation on a code block, abstract values may be generated (e.g., a range of integers, any non-numerical string, etc.), rather than specific, concrete values. In one or more embodiments, performing abstract interpretation on a code block may involve modifying and/or propagating abstract values until a fixed point is reached (e.g., where abstract values do not change on subsequent iterations of a loop).

In one or more embodiments, abstract interpretation may be used to determine whether the code blocks embedded in the document include potentially malicious code. A code block may include potentially malicious code when the code block uses a vulnerable method in a blacklist included in the runtime model, the code block potentially generates a vulnerable behavior included in the runtime model, or the code block generates an unknown behavior.

FIG. 1A shows a computer system (100) in accordance with one or more embodiments of the invention. As shown in FIG. 1A, the computer system (100) includes a repository (102) and a document analyzer (104). In one or more embodiments, the computer system (100) takes the form of the computing system (500) described with respect to FIG. 5A and the accompanying description below, or takes the form of the client device (526) described with respect to FIG. 5B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a document (106), an application (108), and a runtime model (110). In one or more embodiments, the document (106) is a file that may be represented using the Portable Document Format (PDF), HTML, XML, or any other file format. In one or more embodiments, the document (106) includes code blocks (112A, 112N). In one or more embodiments, a file format may permit the embedding of code blocks (112A, 112N) written in a programming language (e.g., JavaScript) to perform various functions. For example, a code block (112N) may validate input in forms and/or offer shortcuts for common actions performed on the document (106) such as printing. In one or more embodiments, the document (106) includes metadata (116). For example, the metadata (116) may include various properties (e.g., author, title) of the document (106).

In one or more embodiments, the programming language may include an application programming interface (API) and/or a library. In one or more embodiments, an API includes subroutine (e.g., function) definitions, protocols, and/or tools for building application software. In one or more embodiments, a library is a collection of implementations of behaviors with well-defined interfaces by which the behaviors are invoked. For example, a higher level program may use a library to invoke system calls instead of directly implementing those system calls.

In one or more embodiments, the application (108) is a collection of source code including various software components (e.g., a collection of computer instructions written in a human-readable programming language). In one or more embodiments, the application (108) is used to process the document (106). For example, the application (108) may be a PDF reader that processes documents (106) represented in PDF. The application (108) may be transformed by a compiler program into binary machine code. Compiled machine code may then be executed by a processor (e.g., contained in computer system (100)) in order to execute the software components generated from the application (108).

In one or more embodiments, code blocks (112A, 112N) may be collections of source code. A code block (112N) may be transformed by a compiler into binary machine code. In one or more embodiments, code blocks (112A, 112N) may be represented in a procedural or imperative programming language (e.g., JavaScript). In one or more embodiments, a code block (112N) corresponds to a function definition (e.g., an event handler).

In one or more embodiments, code blocks (112A, 112N) include statements (114A, 114N). In one or more embodiments, a statement (114N) is an instruction represented in a computer language. In one or more embodiments, a statement (114N) is a line in a code block (112N). A statement (114N) may be an entry point where an external program invokes the code block (112N). For example, an entry point may implement an application program interface (API). A statement (114N) may invoke a function definition (e.g., a procedure or a method).

Continuing with FIG. 1A, in one or more embodiments, the runtime model (110) is an abstract execution environment for the document (106). That is, the runtime model (110) may provide an execution framework within which the behavior of the code blocks (112A, 112N) of the document (106) may be analyzed using abstract interpretation, as described below. The runtime model (110) may extend the (concrete) runtime environment for a programming language in which the code blocks (112A, 112N) and the application (108) are implemented.

Figure 1B:
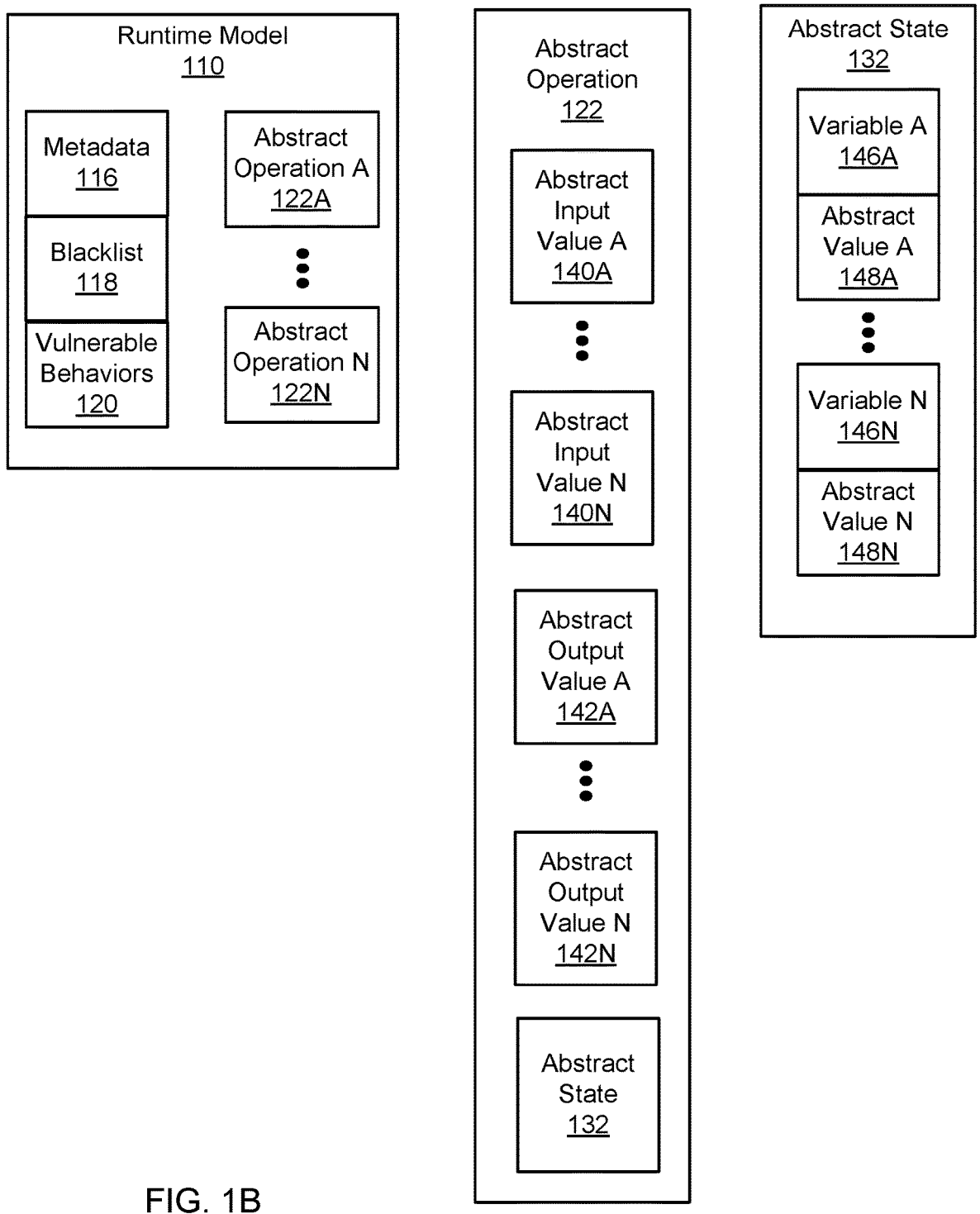

Turning to FIG. 1B, in one or more embodiments, the runtime model (110) includes metadata (116), a blacklist (118), vulnerable behaviors (120), and abstract operations (122A, 122N). In one or more embodiments, the metadata (116) includes variables, constants and/or functions of the runtime environment that are specific to the application (108). For example, the metadata (116) may include: a variable indicating the operating system used by the computer system (100). In one or more embodiments, the runtime model (110) may include global objects that are used by the application (108). For example, the runtime model (110) for a PDF reader application implemented in JavaScript may include the global static objects app and doc (e.g., based on a specification for the PDF reader application).

In one or more embodiments, the blacklist (118) indicates properties and/or functions of the programming language used to implement the code blocks (112A, 112N) that are known to be vulnerable to malicious code (e.g., functions listed in a dictionary of publicly known cybersecurity vulnerabilities). In one or more embodiments, the blacklist (118) indicates vulnerable properties and functions of an application programming interface (API) for the programming language used to implement the application (108). For example, util.printf( ) is a vulnerable function of the JavaScript API that is implemented by a PDF reader application.

In one or more embodiments, the runtime model (110) identifies vulnerable behaviors (120). In one or more embodiments, the vulnerable behaviors (120) are behaviors of the programming language used to implement the code blocks (112A, 112N) that are known to be correlated with the presence of potentially malicious behavior. Some of the vulnerable behaviors (120) may be associated with unintended side effects caused by otherwise safe operations (e.g., file creation). Some of the vulnerable behaviors (120) may be associated with defect types (134A, 134N) related to memory corruption. Other examples of vulnerable behaviors (120) may include: the size of a string potentially exceeding a pre-defined limit, the size of an array or other object potentially exceeding a pre-defined limit, unchecked access to a file system, buffer overflow, denial of service errors, etc.

As shown in FIG. 1B, in one or more embodiments, the runtime model (110) includes abstract operations (122A, 122N). In one or more embodiments, an abstract operation (122A, 122N) transforms abstract input values (140A, 140N) into abstract output values (142A, 142N). In one or more embodiments, an abstract operation (122A, 122N) transforms abstract input values (140A, 140N) into abstract output values (142A, 142N) using an abstract state (132). In one or more embodiments, an abstract operation (122A, 122N) modifies an abstract state (132) (e.g., based on abstract input values (140A, 140N)). In one or more embodiments, each abstract input value (140A, 140N) and abstract output value (142A, 142N) is an abstract value (148A, 148N). In one or more embodiments, each abstract value (148A, 148N) represents a set of concrete values. Using abstract values (148A, 148N) may avoid the need to enumerate all executions of code blocks (112A, 112N) on concrete inputs.

Examples of abstract values (148A, 148N) for integers may include: any integer, any positive integer, any nonzero integer, a set of specific integers, etc. Examples of abstract values (148A, 148N) for strings may include: any string, any non-empty string, a specific string (such as a string obtained from a metadata property of the document or a runtime environment variable), a set of specific strings, numerical strings, non-numerical strings, etc. For example, the abstract value $T_{number}$ represents any number and the abstract value $T_{string}$ represents any string. As another example, an integer value may be abstracted as the sign of the integer value (e.g., if it is important to determine whether the integer value can be negative). As yet another example, an abstract value (148N) may correspond to a range of concrete integer values. In addition, the abstract string values "number" and "not a number" may be useful in disambiguating between types of string values (e.g., between string values that denote a number vs. string values that do not denote a number).

In one or more embodiments, as shown in FIG. 1B, the abstract state (132) includes pairs of variables (146A, 146N) and abstract values (148A, 148N). For example, the abstract state (132) may assign an abstract value (148N) of "any numerical string" to one or more variables (146A, 146N) used in a statement (114N) of a code block (112N).

A variable (146N) may be a symbol (e.g., 'x', 'y', 'input', 'result') that references a location in a code block (112N) where a value is stored, such as an allocation site. In one or more embodiments, a variable (146N) may be a field of an object. An allocation site may be a statement in a code block (112N) that declares, instantiates, and/or initializes an object. A variable (146N) may refer to a simple allocation site (e.g., a numerical or string value), may refer to a complex allocation site (e.g., a base object or structure containing one or more fields), or may refer to a field in a complex allocation site. The allocation site may contain different values at different points in time. In one or more embodiments, the allocation site may refer to a location in a memory (e.g., a heap memory) of the computer system (100) that is allocated when a function definition in the code block (112N) that includes the allocation site is executed.

Using abstract values (148A, 148N) may permit multiple concrete runtime environments to be simulated via a single runtime model (110). In addition, since abstract interpretation is based on reasoning about the behavior, rather than the structure of code blocks (112A, 112N), abstract interpretation may be resistant to obfuscation attempts by malware based on mimicking known (presumably benign) structures.

Returning to FIG. 1A, in one or more embodiments, the document analyzer (104) may be implemented in hardware (e.g., circuitry), software, firmware, and/or any combination thereof. In one or more embodiments, the document analyzer (104) includes a code extractor (126), a result (128), and a report (130).

In one or more embodiments, the document analyzer (104) includes functionality to perform abstract interpretation to compute properties of the code blocks (112A, 112N) of the document (106). In one or more embodiments, abstract interpretation is a static program analysis technique that over-approximates the behavior of a code block (112N), enabling the document analyzer (104) to check whether a code block (112N) can exhibit malicious behavior under any possible execution, without directly executing the code block (112N).

In one or more embodiments, the document analyzer (104) models the behavior of code blocks (112A, 112N) using abstract operations (122A, 122N). In one or more embodiments, the document analyzer (104) includes functionality to generate abstract states (132A, 132N) corresponding to statements (114A, 114N) in a code block (112N). For example, the document analyzer (104) may generate an abstract state (132N) corresponding to a statement (114N) in a code block (112N), where the abstract state (132N) includes information about possible concrete executions of the statement (114N).

Although computing non-trivial properties of code blocks (112A, 112N) is an undecidable problem when concrete language semantics is used, when concrete values and operations are approximated with abstract values (148A, 148N) and abstract operations (122A, 122N), computing non-trivial properties of a code block (112A, 112N) may become efficiently computable. However, efficiency may come at the cost of losing precision for some properties due to the abstraction (approximation) that is applied. In the context of static analysis to detect malicious code, imprecision may result in false positives, where benign code blocks (112A, 112N) are flagged as potentially malicious.

Continuing with FIG. 1A, in one or more embodiments, the document analyzer (104) may include functionality to generate a report (130) that includes statements (114A, 114N) and defect types (134A, 134N). For example, the report (130) may indicate that a statement (112N) corresponds to a defect type (134N). Examples of defect types (134A, 134N) may include: a call to a function in a blacklist (118), a vulnerable behavior (120), an unknown behavior, etc. Defect types (134A, 134N) may be specific to a programming language. In one or more embodiments, the report (130) may be stored as a document capable of being accessed by an interested entity (e.g., a programmer).

In one or more embodiments, the report (130) includes a trace of any potentially malicious abstract values (140A, 140N) flowing into each defective statement (114A, 114N). For example, the trace may begin where a potentially malicious abstract value (140N) is initially obtained (e.g., at a statement (114N) that is an entry point to a code block (112N)), and may continue to the statements (114A, 114N) which reference and/or modify the potentially malicious abstract value (140N).

In one or more embodiments, the code extractor (126) includes functionality to extract code blocks (112A, 112N) from the document (106). In one or more embodiments, the code extractor (126) may extract code blocks (112A, 112N) using standard tools for extracting various components of a file. Examples of such tools may include: pattern-matching techniques (e.g., based on the syntax of a programming language, such as JavaScript), various heuristic techniques, etc. In one or more embodiments, the structure of the document (106) may be validated while the code blocks (112A, 112N) are being extracted from the document (106).

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
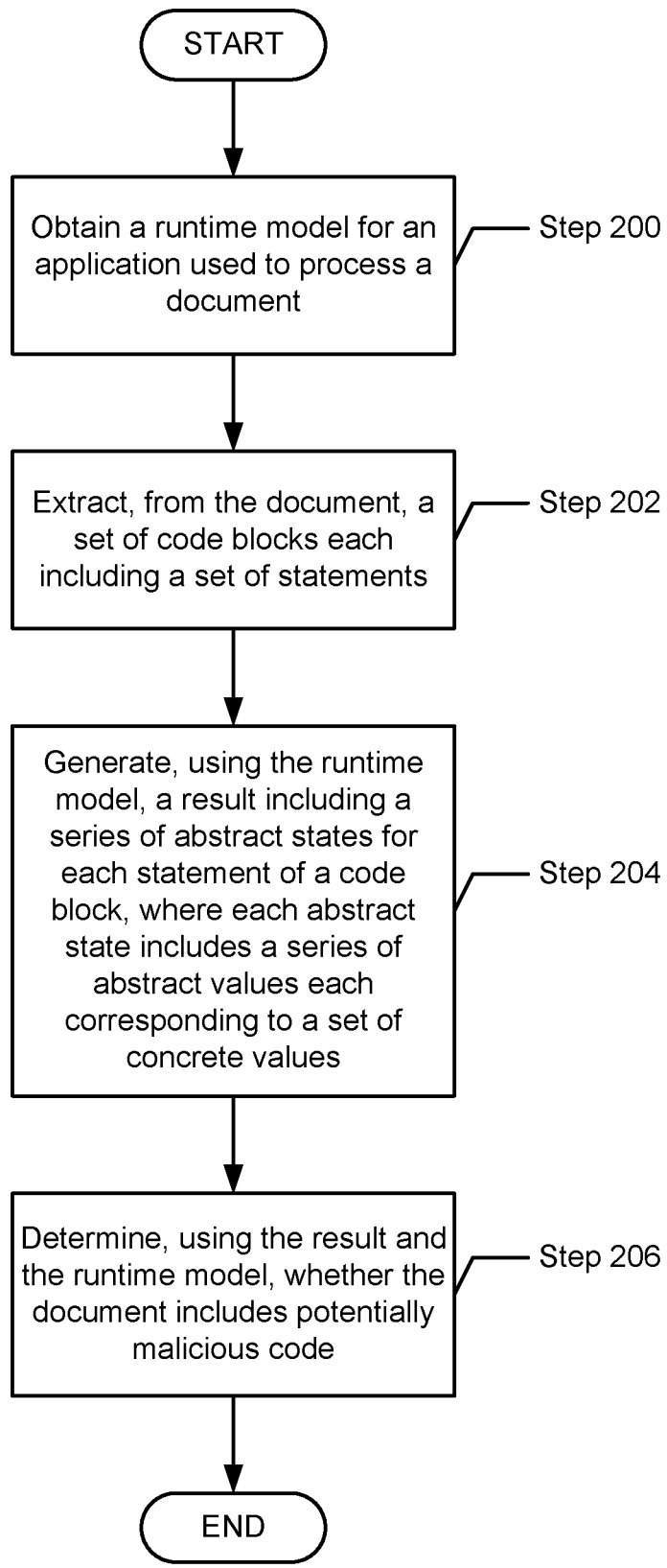
FIG. 2 and FIG. 3 show flowcharts in accordance with one or more embodiments of the invention.

FIG. 2 shows a flowchart in accordance with one or more embodiments of the invention. The flowchart depicts a process for analyzing a document. One or more of the steps in FIG. 2 may be performed by the components (e.g., the document analyzer (104) and/or the code extractor (126)) of the computer system (100), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a runtime model for an application used to process a document is obtained. The document may be obtained from a repository, from a user, or from an external source. In one or more embodiments, the runtime model is an abstract execution environment for the document. That is, the runtime model may provide an execution framework within which the behavior of code blocks of the document (e.g., code blocks extracted in Step 202 below) may be analyzed using abstract interpretation, as described below. The runtime model may extend the (concrete) runtime environment for a programming language in which the code blocks and the application are implemented.

In one or more embodiments, the runtime model may include variables, constants and/or functions that are specific to the application (e.g., the application may be a PDF reader used to process documents represented in PDF). The runtime model may be obtained from a domain expert with knowledge of the implementation of the application in the programming language. In one or more embodiments, the runtime model includes abstract operations whose inputs and outputs are abstract values. Each abstract value may represent a set of concrete values. For example, the abstract value $T_{number}$ represents any number and the abstract value $T_{string}$ represents any string. Using abstract values may avoid the need to enumerate all executions of code blocks on concrete inputs.

In one or more embodiments, the runtime model may support the analysis and simulation (e.g., interpretation) of statements in code blocks via the generation of abstract values (e.g., instead of concrete values) associated with the statements, and the propagation of abstract values between statements and/or code blocks.

In one or more embodiments, the runtime model includes metadata such as objects of the runtime environment that are specific to the application. In one or more embodiments, the runtime model includes a blacklist identifying properties and/or functions of the programming language (and/or an API for the programming language) used to implement the code blocks that are known to be vulnerable to malicious code. In one or more embodiments, the runtime model includes vulnerable behaviors of the programming language used to implement the code blocks that are known to be correlated with the presence of potentially malicious behavior. An example of a vulnerable behavior is the size of an object potentially exceeding a pre-defined limit A vulnerable behavior may be associated with unintended side effects caused by an otherwise safe operation (e.g., file creation).

In Step 202, a set of code blocks each including a set of statements is extracted from the document. For example, the code blocks may include useful features such as: input validation in forms, shortcuts for common actions such as printing, and controlling multimedia objects and interactions between the application and a file system and/or network. In one or more embodiments, the code blocks may be extracted using standard tools for extracting various components of a file. In one or more embodiments, metadata (e.g., properties embedded in the document, such as title, author, subject, etc.) and/or global objects that are used by the application may be extracted in addition to extracting the code blocks. In one or more embodiments, the structure of the document may be validated in order to ensure that the document is a well-formed document with no structural errors. If the structure of the document is found to be invalid, then any embedded code blocks included in the document may be disabled.

In Step 204, a result is generated, using the runtime model, that includes a series of abstract states for each statement of a code block. In one or more embodiments, each abstract state includes a series of abstract values each corresponding to a set of concrete values. For example, each variable referenced in a statement may be assigned an abstract value. In one or more embodiments, the abstract state may relate to a point after executing the statement. In one or more embodiments, the abstract state may relate to a point prior to executing the statement.

In one or more embodiments, the set of concrete values corresponding to an abstract value may be determined using metadata extracted in Step 202 above. For example, an abstract value may be made more precise by restricting the abstract value to a set of permissible concrete string values of a metadata variable (e.g., a metadata variable corresponding to a property of the document, such as title or author, or a property of the runtime model, such as the operating system used by the computer system). Restricting an abstract value to a set of specific, concrete values may avoid a false positive scenario where non-malicious code is flagged as potentially malicious.

In one or more embodiments, the result may be generated by simulating the execution of (e.g., interpreting) the code block using the runtime model. In one or more embodiments, simulating the execution of the code block may involve propagating an abstract value between a first statement and a second statement. For example, an abstract value of a variable used in an assignment statement and/or a function invocation may be propagated using a control flow graph generated for the code block. In one or more embodiments, the first statement and the second statement may reside in different code blocks. Although precision may be sacrificed by reasoning about abstract values (e.g., relative to reasoning about specific, concrete values), using abstract values it is possible to analyze all possible behaviors of the code block without directly executing the code block.

In one or more embodiments, the result includes a series of abstract states generated for each statement of each code block extracted in Step 202 above.

In Step 206, it is determined, using the result and the runtime model, whether the document includes potentially malicious code. In one or more embodiments, the document includes potentially malicious code when a code block of the document uses a vulnerable function identified in a blacklist of the runtime model (e.g., the blacklist may include functions listed in a dictionary of publicly known cybersecurity vulnerabilities). In one or more embodiments, the document includes potentially malicious code when a code block of the document potentially generates a vulnerable behavior (e.g., an overflow condition in an array, string, or integer value) identified in the runtime model. In one or more embodiments, the document includes potentially malicious code when a code block of the executable code may be executed with an unknown input (e.g., an input provided by a user or some other external source). For example, a call to eval with an unknown input may be considered to be potentially malicious. In addition, an attempt to lookup a function to be invoked using an unknown string value may be considered to be potentially malicious. For example, an unknown string input may contain obfuscated malicious code.

If the document analyzer cannot prove, via the propagation of abstract values, that the behavior of a code block is safe, then the code block may be flagged as potentially malicious. The capability for reasoning about all possible behaviors and values of a code block enables the abstract interpretation analysis to be sound in the sense that false negatives may be avoided.

Figure 3:
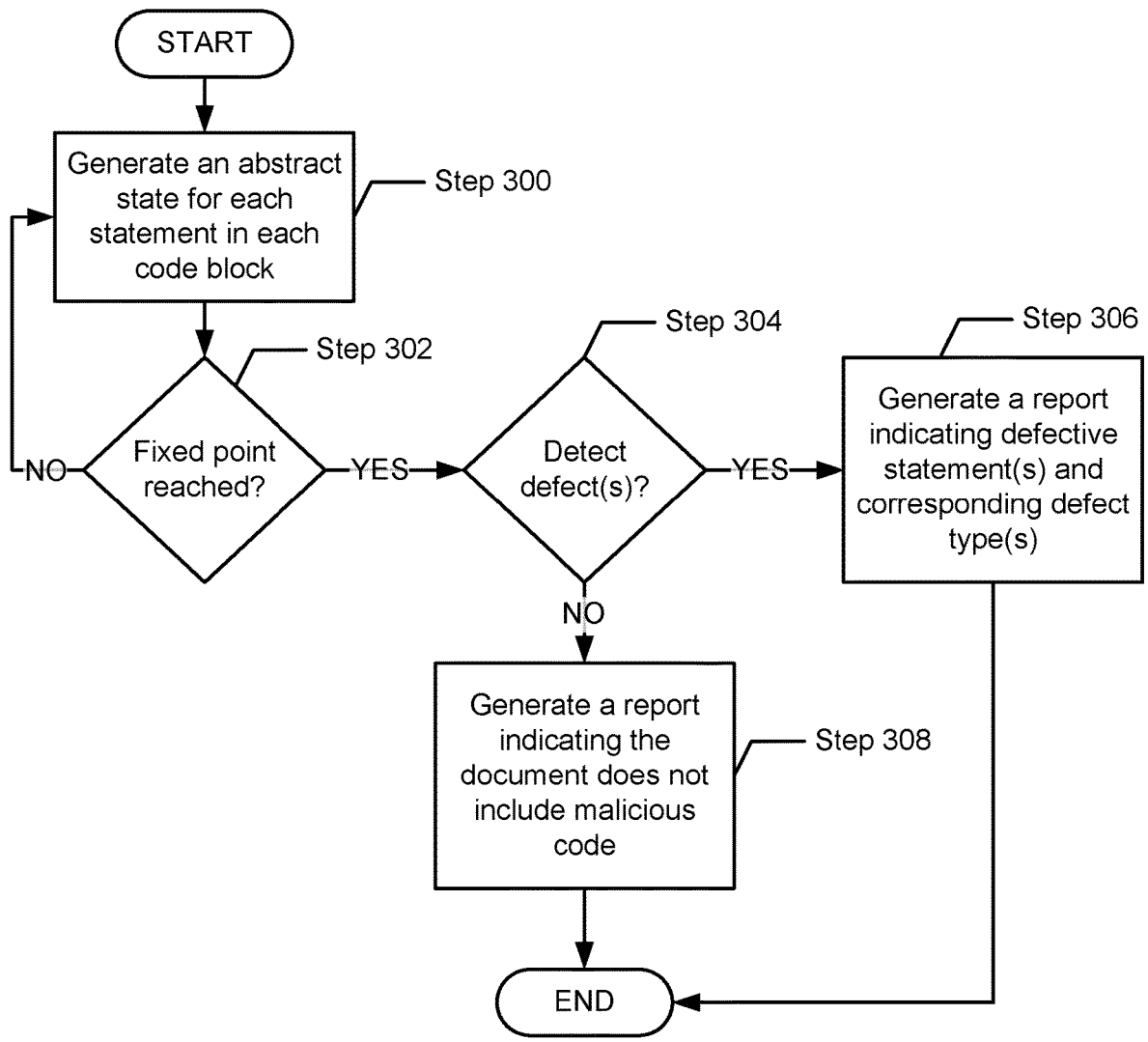

FIG. 3 shows a flowchart in accordance with one or more embodiments of the invention. The flowchart depicts a process for analyzing a document. Moreover, the flowchart in FIG. 3 may correspond to Step 204 and Step 206 in FIG. 2. One or more of the steps in FIG. 3 may be performed by the components (e.g., the document analyzer (104)) of the computer system (100), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, an abstract state for each statement of each code block is generated (see description of Step 204 above). In one or more embodiments, the abstract state is generated by simulating the execution of the code block using the model of the runtime environment. Simulating the execution of a code block may involve modifying an abstract value of an abstract state. In one or more embodiments, simulating the execution of a code block that includes an iteration loop includes stepping through successive iterations of the loop in successive executions of Step 300.

Each successive iteration may modify an abstract value. In one or more embodiments, during successive iterations of the loop, a previous abstract value may be replaced by a next abstract value whose corresponding concrete values are a proper superset of the concrete values corresponding to the previous abstract value. That is, the next abstract value may represent the most precise abstract value that covers the cumulative behavior of all iterations of the loop up to the current iteration. In other words, the next abstract value may encompass all of the concrete values generated in earlier iterations. For example, the previous abstract value may correspond to a set of concrete non-numerical string values, and the next abstract value may correspond to a superset of the concrete non-numerical string values. Alternatively, the next abstract value may be the abstract value $T_{string}$, which corresponds to any string value.

In one or more embodiments, various combinations of executing the code blocks extracted from the document are simulated and analyzed. In one or more embodiments, simulation begins at an entry point (e.g., corresponding to an API function) of a code block. For example, the code blocks may correspond to event handlers that are responsive to user input obtained at runtime, where the event handlers may be invoked (e.g., mutually recursively) in various combinations.

In one or more embodiments, if during the execution of Step 300, a pre-determined time interval is exceeded, then to be consistent with a conservative approach to abstract interpretation (i.e., avoiding the generation of a false negative), a report is generated indicating that the document includes potentially malicious code. Similarly, if a pre-determined amount of computational (e.g., memory) resources is exceeded, then a report is generated indicating that the document includes potentially malicious code.

If Step 302 determines that each abstract state generated in Step 300 above reaches a fixed point, then Step 304 below is executed. Otherwise, if Step 302 determines that each abstract state has not reached the fixed point, then Step 300 above is again executed (e.g., to further propagate abstract values within and/or across the code blocks extracted from the document).

In one or more embodiments, the fixed point is reached when each abstract state is unchanged on a next iteration of a loop. For example, a fixed point may be reached when, during a successive iteration of the loop, a previous abstract value of each abstract state is replaced by a next abstract value whose corresponding concrete values are equivalent to the concrete values corresponding to the previous abstract value.

If, in Step 304, any defects are detected (see description of Step 206 above), then Step 306 below is executed. Otherwise, if no defects are detected, then in Step 308 a report is generated indicating that the document does not include potentially malicious code. In one or more embodiments, a defect may correspond to one of several defect types, including: a call to a function included in a blacklist, a vulnerable behavior, an unknown behavior, etc.

In Step 306, a report is generated indicating the defective statement(s) and corresponding defect type(s). In one or more embodiments, the report includes a trace of any potentially malicious abstract values flowing into each defective statement. For example, the trace may begin where the potentially malicious abstract value is initially obtained (e.g., at an entry point to a code block), and may continue to the statements which reference and/or modify the potentially malicious abstract value. The trace may assist a programmer in determining whether a defective statement corresponds to an actual defect or a false positive. For example, it may be useful to examine all traces that include an entry point and the defective statement, or just one trace that includes an entry point and the defective statement.

Figure 4A:
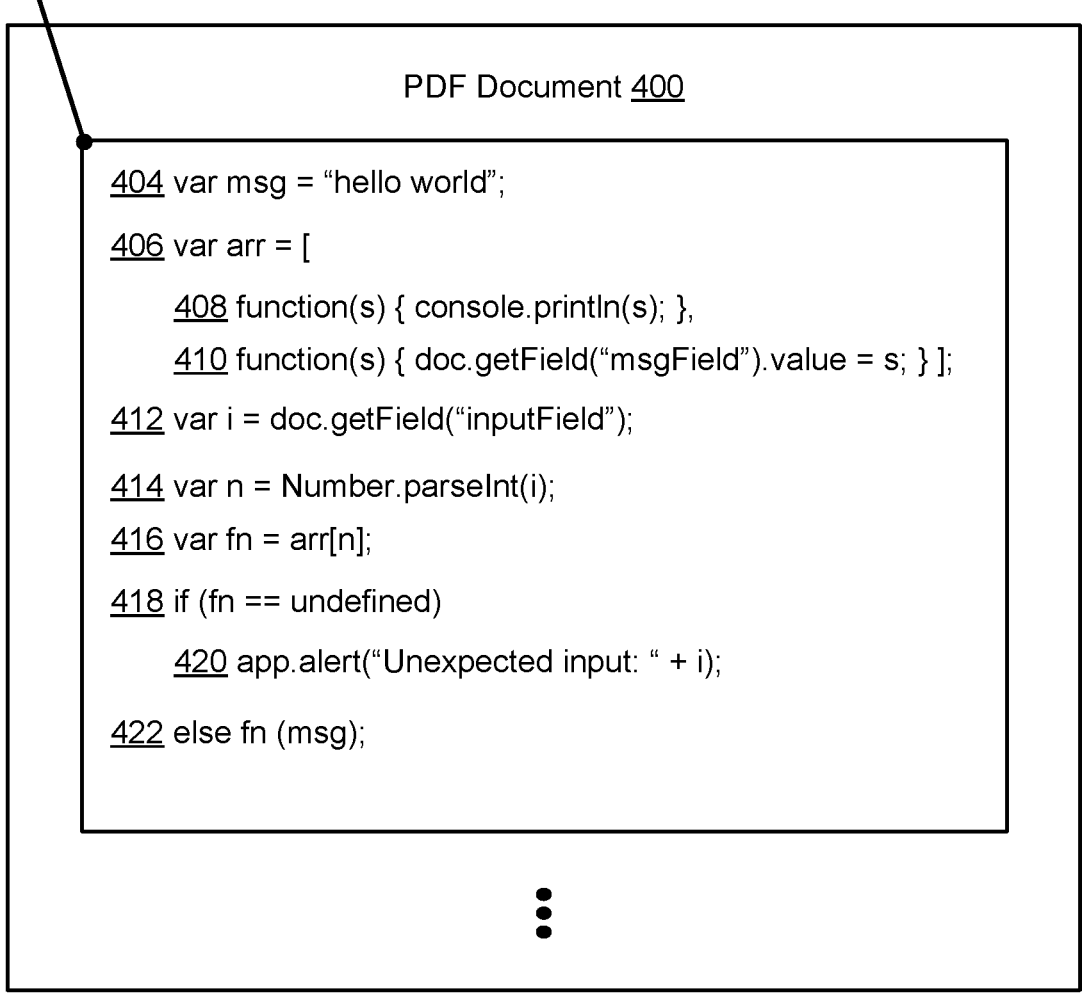
Figure 4B:
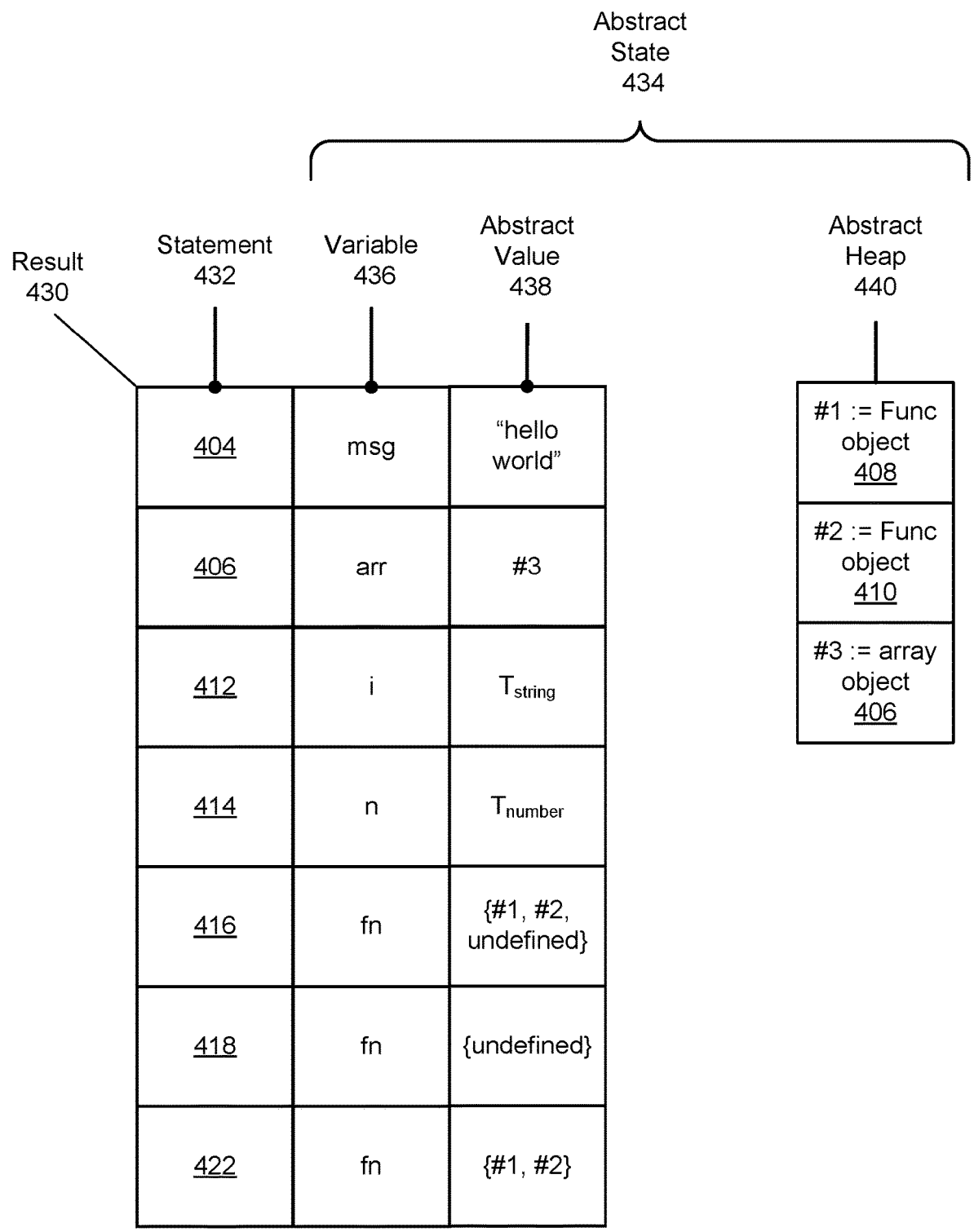

The following example is for explanatory purposes only and not intended to limit the scope of the invention. FIG. 4A, FIG. 4B, and FIG. 4C show an implementation example in accordance with one or more embodiments of the invention.

FIG. 4A illustrates a portion of a JavaScript code block (402) of a PDF document (400). FIG. 4B illustrates the result (430) generated as the document analyzer (104) performs abstract interpretation on the code block (402). The result (430) includes an abstract state (434) for various statements (432) in the code block (402). Each abstract state (434) includes a set of variables (436) mapped to abstract values (438). Each abstract state (434) also includes an abstract heap (440), which may be updated after each statement (432) is executed. For brevity, FIG. 4B only illustrates changes to the abstract states (434).

At statement (404), the variable msg is assigned an abstract value (438) that corresponds to a single concrete string value, "hello world", as shown in FIG. 4B. At statement (406), the variable arr is assigned an abstract value (438) corresponding to an abstract array object that includes two function objects (408, 410), which are stored in an abstract heap (440) at locations #1 and #2, respectively, as shown in FIG. 4B. The abstract array object itself is stored at location #3 of the abstract heap (440).

At statement (412), the function getField (a PDF API) returns a user input that cannot be known statically. However, based on the specification of getField, the return value may be approximated as any string, denoted by the abstract value $T_{string}$, as shown in FIG. 4B. In an alternate scenario, if the document analyzer (104) determines that the return value of getField may be restricted to a set of specific, concrete values (e.g., if the valid field names of a document object are restricted to a list of immutable constants provided by the runtime environment), then the corresponding abstract value may be narrowed to the set of specific, concrete values (i.e., instead of "any string").

At statement (414), the abstract value returned by getField is passed to parseInt (a JavaScript built-in function), which returns an integer value if the input string can be parsed, and the abstract value "not a number" otherwise. In this case, since the variable i is any string value, then parseInt returns any integer value, denoted by the abstract value $T_{number}$, as shown in FIG. 4B.

At statement (416), the resulting integer value in the variable n is used as a property lookup into the array variable arr. The integer value is converted to a string value during the lookup (according to the semantics of JavaScript). Therefore, array values with property names that are number strings (i.e., "0" and "1") match the lookup and are returned as results to be assigned to the function variable fn. The value undefined may also be returned because the abstract value "any integer" also includes numbers (e.g., 2, 3, 99, etc.) that do not correspond with any entry in the array object referenced by the variable arr. Therefore, the abstract state (434) corresponding to statement (416) indicates that the variable fn may be assigned #1, #2, or undefined, as shown in FIG. 4B.

At statement (418), the document analyzer (104) determines that the value of the variable fn may be undefined, and therefore it is possible to execute the "then" branch at statement (420), where the call to app.alert is invoked. At statement (422), the document analyzer (104) determines that undefined may be removed from the possible values of the variable fn (i.e., since the value undefined only comes into play in the "then" branch at statement (420)). Therefore, the call to function variable fn at statement (422) may only be invoked with the two functions defined in the array variable arr, as shown in FIG. 4B.

FIG. 4C illustrates a PDF-JavaScript runtime model (450) that may be used by the document analyzer (104) during abstract interpretation. The PDF-JavaScript runtime model (450) extends the concrete JavaScript runtime environment for a PDF reader application.

As shown in FIG. 4C, the PDF-JavaScript runtime model (450) includes variables and functions that are specific to the PDF reader application, such as app (452), doc (456), PDF_Event (462), and PDF_DOM_NODE (464). The PDF-JavaScript runtime model (450) includes abstract operations, such as the app.alert function (454), whose output is conservatively modeled as an abstract value corresponding to any integer, denoted by $T_{number}$. However, the specification for the PDF reader application indicates that the app.alert function (454) returns an integer in the set $\{1, 2, 3, 4\}$. Specifying $T_{number}$ as the return value of the app.alert function (454) therefore conservatively over-approximates the set of possible concrete return values, while soundly modeling the app.alert function (454). For example, $T_{number}$ subsumes the set $\{1, 2, 3, 4\}$. Similarly, because the author (458) and subject (460) metadata properties are specified as $T_{string}$, the author (458) and subject (460) properties are soundly over-approximated as any string value (i.e., sound, in the sense that false negatives are avoided).

The document analyzer (104) loops over and triggers each entry point in each code block extracted from the PDF document (400), until a fixed point is reached, indicating that a sound and conservative description of the behavior of the code blocks has been found. Since JavaScript code in PDF documents is largely event-driven (i.e., triggered by system or user events), the various code blocks may invoke one another at runtime (e.g., in a mutually recursive manner), depending on the specific flow of events occurring at runtime. For example, a code block of the document (400) may be an event handler that is executed when triggered by a user action, such as clicking on a field in a form.

The PDF_Event object (462) of the PDF-JavaScript runtime model (450) is passed to each code block when the document analyzer (104) performs abstract interpretation of the code block. The PDF_Event object (462) indicates the types of abstract values corresponding to the fields of the PDF_Event object (462). For example, $T_{string}$, $T_{number}$, and $T_{Bool}$ correspond to any string, integer, and Boolean value, respectively.

The document analyzer (104) performs abstract interpretation of the code blocks (e.g., event handlers) of the PDF document (400) by propagating abstract values between statements in the code blocks, invoking the various code blocks until the flow of propagated abstract values within and/or between code blocks reaches a fixed point (e.g., when no additional changes to abstract values are generated as a result of invoking the code blocks). The document analyzer (104) checks for defects during the abstract interpretation process. One defect detected by the document analyzer (104) is a call (e.g., with an unknown input value) to a function (e.g., util.printf( )) identified in a blacklist of the PDF-JavaScript runtime model (450) that includes functions known to be vulnerable to malicious code. Another defect detected by the document analyzer (104) during the abstract interpretation is a potential buffer overflow (e.g., due to the size of an object growing beyond a pre-determined limit), which is identified as a vulnerable behavior in the PDF-JavaScript runtime model (450). For example, the buffer overflow may be known to permit the execution of arbitrary code.

Figure 5A:
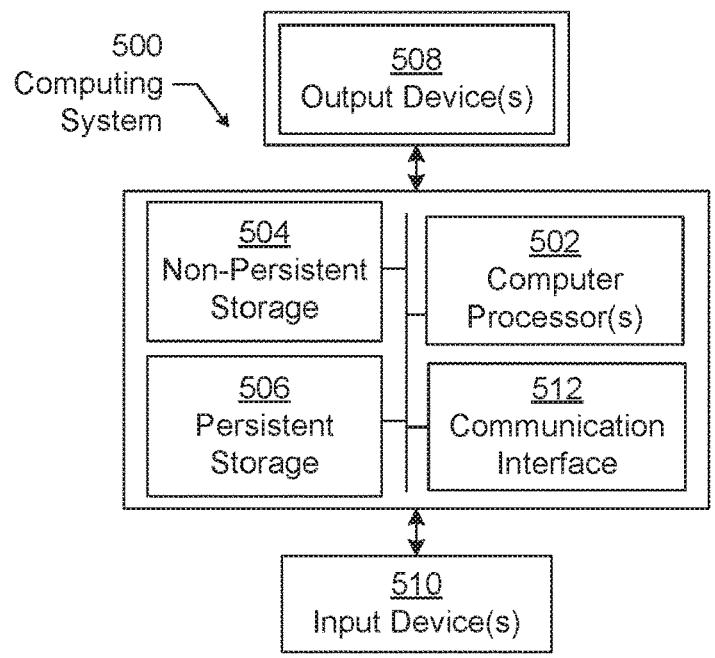
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
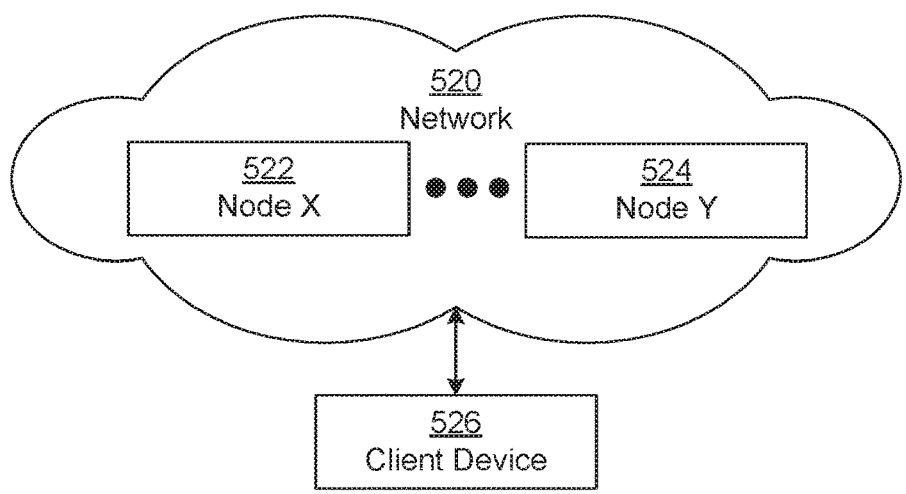

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing a document, comprising:
  obtaining, by a computer processor, a runtime model for an application used to process the document;
  extracting, from the document, a set of code blocks each comprising a set of statements;
  generating, using the runtime model, a result comprising a series of abstract states for each statement of a code block of the set of code blocks, wherein each abstract state of the series of abstract states comprises a series of abstract values each corresponding to a set of concrete values; and
  determining, using the result and the runtime model, whether the document comprises potentially malicious code by determining whether a first series of abstract values of a first abstract state of the result comprises:
    a previous abstract value corresponding to a first set of concrete values, and
    a next abstract value corresponding to a second set of concrete values, wherein the next abstract value is equivalent to the previous abstract value.

2. The method of claim 1,
  wherein the runtime model comprises metadata,
  the method further comprising:
    determining, using the metadata, the first set of concrete values.

3. The method of claim 1, wherein determining whether the document comprises potentially malicious code further comprises:
  determining that a statement of the code block corresponds to a defect type selected from a group consisting of a call to a function in a blacklist of the runtime model, a vulnerable behavior identified in the runtime model, and an unknown behavior.

4. The method of claim 1, further comprising:
  generating a report comprising a statement of the code block and a defect type, wherein the statement corresponds to the defect type.

5. A system, comprising:
  a repository to store a runtime model and a document, wherein the document comprises a set of code blocks each comprising a set of statements;
  a processor; and
  a memory comprising instructions that, when executed by the processor, cause the processor to:
    obtain the runtime model for an application used to process the document;
    extract the set of code blocks from the document;
    generate, using the runtime model, a result comprising a series of abstract states for each statement of a code block of the set of code blocks, wherein each abstract state of the series of abstract states comprises a series of abstract values each corresponding to a set of concrete values; and
    determine, using the result and the runtime model, whether the document comprises potentially malicious code by determining whether a first series of abstract values of a first abstract state of the result comprises:
      a previous abstract value corresponding to a first set of concrete values, and
      a next abstract value corresponding to a second set of concrete values, wherein the next abstract value is equivalent to the previous abstract value.

6. The system of claim 5,
  wherein the runtime model comprises metadata, and
  wherein the memory further comprises instructions that, when executed by the processor, cause the processor to:
    determine, using the metadata, the first set of concrete values.

7. The system of claim 5, wherein determining whether the document comprises potentially malicious code further comprises:
  determining that a statement of the code block corresponds to a defect type selected from a group consisting of a call to a function in a blacklist of the runtime model, a vulnerable behavior identified in the runtime model, and an unknown behavior.

8. The system of claim 5, wherein the system further comprises a report comprising a statement of the code block and a defect type, wherein the statement corresponds to the defect type, wherein the memory further comprises instructions that, when executed by the processor, cause the processor to: generate the report.

9. A non-transitory computer readable medium comprising instructions that, when executed by a processor, perform:
  obtaining a runtime model for an application used to process the document;
  extracting, from the document, a set of code blocks each comprising a set of statements;
  generating, using the runtime model, a result comprising a series of abstract values corresponding to each statement of a code block of the set of code blocks, wherein each abstract value of the series of abstract values corresponds to a set of concrete values; and
  determining, using the result and the runtime model, whether the document comprises potentially malicious code by determining whether a first series of abstract values of a first abstract state of the result comprises:
    a previous abstract value corresponding to a first set of concrete values, and
    a next abstract value corresponding to a second set of concrete values, wherein the next abstract value is equivalent to the previous abstract value.

10. The non-transitory computer readable medium of claim 9,
  wherein the runtime model comprises metadata,
  further comprising instructions that perform:
    determining, using the metadata, the first set of concrete values.

11. The non-transitory computer readable medium of claim 9, wherein determining whether the document comprises potentially malicious code further comprises:
  determining that a statement of the code block corresponds to a defect type selected from a group consisting of a call to a function in a blacklist of the runtime model, a vulnerable behavior identified in the runtime model, and an unknown behavior.

12. The non-transitory computer readable medium of claim 9, further comprising instructions that perform: generating a report comprising a statement of the code block and a defect type, wherein the statement corresponds to the defect type.

* * * * *